Apr. 10, 1923.
A. F. MASURY
1,451,267
WHEEL MOUNTING FOR MOTOR PROPELLED RAILWAY CARS
Filed Dec. 5, 1921
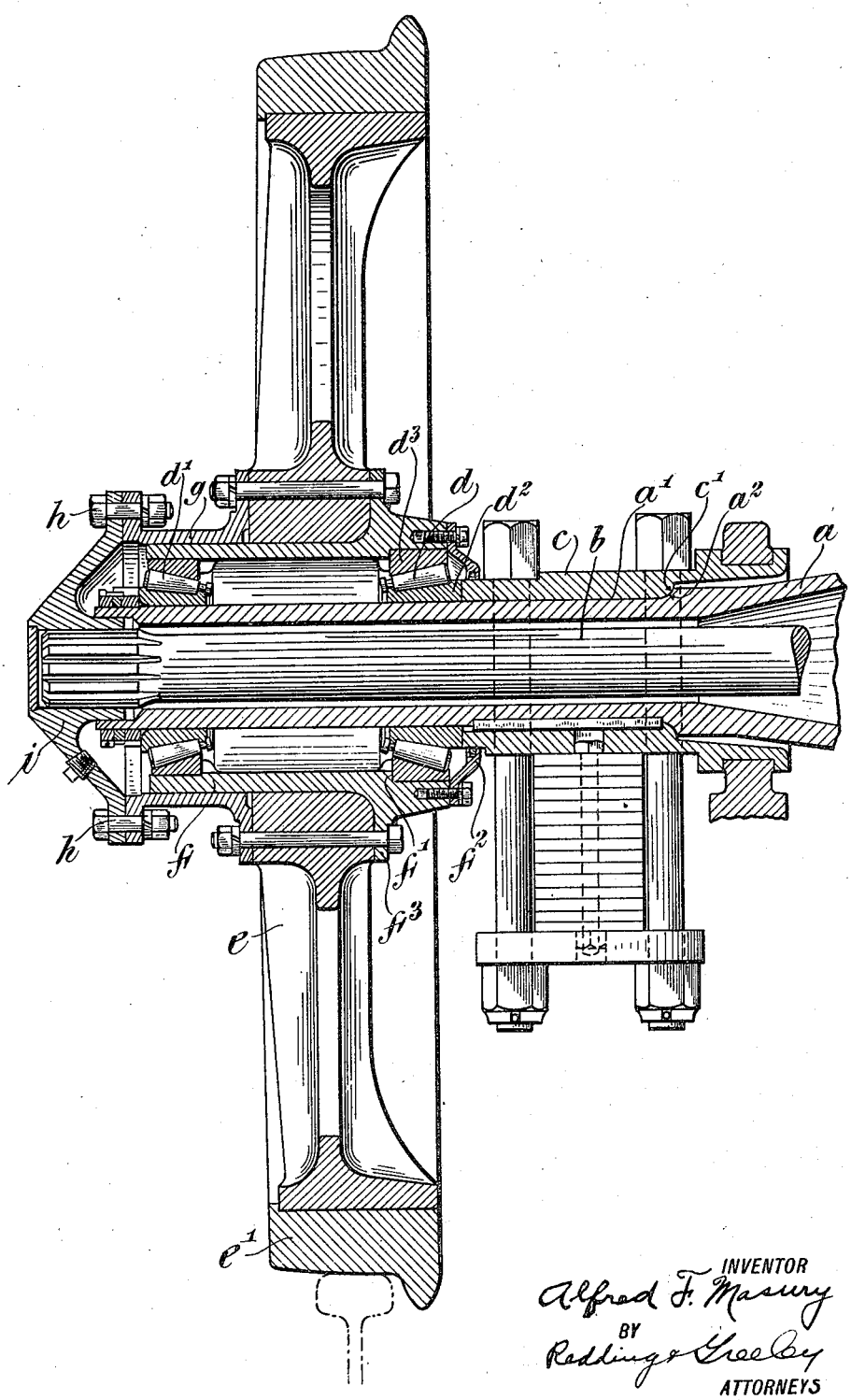
INVENTOR
Alfred F. Masury
BY
Redding & Greeley
ATTORNEYS Patented Apr. 10, 1923.

1,451,267

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

WHEEL MOUNTING FOR MOTOR-PROPELLED RAILWAY CARS.

Application filed December 5, 1921. Serial No. 519,836.

*To all whom it may concern:*

Be it known that I, ALFRED F. MASURY, a citizen of the United States, residing in the borough of Manhattan of the city of New York, in the State of New York, have invented certain new and useful Improvements in Wheel Mountings for Motor-Propelled Railway Cars, of which the following is a specification, reference being had to the accompanying drawing, forming a part hereof.

Much attention is being given to the development of rail cars propelled by internal combustion engines. The logical development of cars calls for the adaptation to railway practice of conventional types of motor vehicles. The principal problem encountered at every turn is to adapt the standard equipment of motor cars to railway requirements. Such a problem is encountered, for instance, in the mounting for the tractor wheels on the rear axle inasmuch as the standard gage of rails is less than the standard gage of the treads of motor vehicles. It might seem at first that a motor car could be operated satisfactorily on rails by merely replacing the traction wheels with car wheels. Such an interchange is not only impossible by reason of the difference in gages but would, if possible, be contrary to accepted railway practice in that the supporting axle housing does not revolve with the wheels but the wheels, rather, rotate on bearings which are carried with the axle housing. It is the object of the present invention to construct a wheel mounting for railway cars which may be adapted to the conventional parts of a motor vehicle with comparatively little expense and afford a mounting which is at once simple, accessible and efficient. A further object of the invention is to provide a mounting for the traction wheels of rail cars in which the supporting axle housing shall not revolve with the wheels but will support bearings on which the wheels revolve about the housing. In accordance with this object of the invention the requirements of rail use have been adapted to accepted automotive practise without sacrificing any of the desirable characteristics of either.

The invention will be described with greater particularity hereinafter in connection with the illustrated embodiment thereof in the single drawing which shows, in vertical section, an improved wheel mounting for railway cars and a fragment of an actual housing and drive shaft of the character used in standard automotive practise.

It is usual in the autombile art in one type of final drive to provide a dead axle tube through which extends a floating jack shaft to drive the traction wheels. On the housing is usually mounted a spring seat. Since the gage of rails is narrower than the standard gage for the treads of wheels of automotive vehicles, it becomes a problem, if car wheels are to be mounted on the conventional parts of such a vehicle, to bring the wheels inwardly on the axle housing until they are spaced apart by a distance equal to the standard gage of rails. This has been accomplished, however, in the present invention, in a very simple and inexpensive manner. The dead axle tube $a$ has been shortened considerably in its width and the live axle section $b$ which is mounted rotatably therein has been shortened to a corresponding extent. These parts are, nevertheless, retained in the relationship in which they are found, in conventional automotive practise. The tube $a$ has been machined off, as indicated at $a'$, for a considerable distance in order that the spring seat $c$ might be placed thereon inside of the wheel bearings $d$, $d'$, and in proper relation thereto. The spring seat $c$ may be formed with a shoulder $c'$ to bear against a corresponding shoulder $a^2$ on the tube $a$ to determine the innermost position of the spring seat and resist lateral movement thereof. In like manner, the race member $d^2$ of the wheel bearing $d$ may rest against the outer edge of the spring seat $c$ and thereby have its innermost position determined and lateral movement resisted. The inner bearing $d$ of the wheel will be found at one side of the load plane and the outer bearing $d'$ will be found at the other side of the load plane so as to give a proper apportionment of stresses on the wheel $e$. The improved wheel itself includes an annular hub section $f$ which is shouldered interiorly at one end, as at $f'$, to form an abutment for the outer race member $d^3$ of the bearing $d$. To the inner edge of the central hub member $f$ may be secured a cover plate $f^2$ through which extends snugly the spring seat $c$, the association between the parts being such as to exclude dust and dirt from the hub and prevent grease and oil from escaping therefrom. The bearing $d'$ is disposed at the opposite end of the hub member $f$. The hub member $f$ has cast therewith an annular hub flange $f^3$ to which may be bolted the web of the wheel on the felly of which is secured a suitable flanged tread $e'$. At the outer side of the web of the wheel $e$ is secured an extension sleeve $g$ to which is bolted, as by bolts $h$, a hub cap $i$, which is splined on the end of the jack shaft $b$. By this construction the driving torque is transmitted from the jack shaft $b$ to the wheel proper through the hub cap $i$ and extension sleeve $g$.

The construction described satisfies railway practise and at the same time marks very little departure from standard automotive practise. The standard axle tube and the live axle of a motor vehicle are employed and are so shortened and otherwise worked on as to adapt them for use on a railway car adapted to run on rails of common gage. The spring seat co-operates with the wheel bearings and with the tube so as to form a simple but secure disposition of parts. The wheel itself is mounted to turn on the dead axle tube instead of, as in railway practise, turning with the supporting axle. The parts are inexpensive and simple and very accessible for assembling, replacement or repair.

What I claim is:

1. In a self-propelled motor railway car, a dead axle tube of conventional automobile design, a live axle section mounted rotatably therein, said tube and section being shortened to adapt them to car rails of standard gage, means carried on the tube for seating a spring, wheel bearings mounted outside of said seat on the dead axle tube, one of said bearings having its inner race in abutment with the edge of said seat, a flanged car wheel mounted on said wheel bearings, and means to connect the car wheel operatively with the live axle section.

2. In a self-propelled motor railway car, a dead axle tube of conventional automobile design, a live axle section mounted rotatably therein, said tube and section being shortened to adapt them to car rails of standard gage, means carried on the tube for seating a spring, wheel bearings mounted outside of said seat on the dead axle tube, one of said bearings having its inner race in abutment with the edge of said seat, a flanged car wheel mounted on said wheel bearings, means to connect the car wheel operatively with the the live axle section, and a cover plate bolted to the wheel and revolving with the wheel about the spring seat in close engagement therewith.

This specification signed this 30th day of November, A. D. 1921.

ALFRED F. MASURY.